United States Patent
Chambon et al.

(10) Patent No.: US 10,461,575 B2
(45) Date of Patent: Oct. 29, 2019

(54) MULTISTATE PWM COMMAND FOR 3 LEVELS INVERTERS

(71) Applicant: SCHNEIDER ELECTRIC IT CORPORATION, West Kingston, RI (US)

(72) Inventors: Patrick Chambon, Saint Martin D'hères (FR); Alain Lacarnoy, Saint Nazaire les Eymes (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 222 days.

(21) Appl. No.: 15/471,319

(22) Filed: Mar. 28, 2017

(65) Prior Publication Data

US 2018/0287420 A1 Oct. 4, 2018

(51) Int. Cl.
| | |
|---|---|
| *H02J 7/00* | (2006.01) |
| *H02J 7/02* | (2016.01) |
| *H02J 9/06* | (2006.01) |
| *H02M 5/458* | (2006.01) |
| *H02M 7/487* | (2007.01) |
| *H02M 7/5395* | (2006.01) |

(Continued)

(52) U.S. Cl.
CPC ............ *H02J 9/062* (2013.01); *H02J 7/0068* (2013.01); *H02J 7/022* (2013.01); *H02M 5/458* (2013.01); *H02M 7/487* (2013.01); *H02M 7/5395* (2013.01); *H02M 7/53871* (2013.01); *H02M 2001/0048* (2013.01); *Y02B 70/1491* (2013.01)

(58) Field of Classification Search
USPC ......................................................... 307/66
See application file for complete search history.

(56) References Cited

U.S. PATENT DOCUMENTS

| | | | |
|---|---|---|---|
| 9,595,876 B2 | 3/2017 | Nielsen | |
| 2007/0228837 A1* | 10/2007 | Nielsen | ................... H02J 9/062 |
| | | | 307/82 |

FOREIGN PATENT DOCUMENTS

| | | |
|---|---|---|
| EP | 0543204 A2 | 5/1993 |
| JP | 3333883 B2 | 10/2002 |
| JP | 2011030380 A | 2/2011 |

(Continued)

OTHER PUBLICATIONS

Extended European Search Report from corresponding European Application No. 18162726.6 dated Aug. 10, 2018.

*Primary Examiner* — Rexford N Barnie
*Assistant Examiner* — Xuan Ly
(74) *Attorney, Agent, or Firm* — Lando & Anastasi, LLP

(57) ABSTRACT

According to one aspect, embodiments of the invention provide a UPS system comprising an input, an output, a converter coupled to the input and configured to convert input power into DC power, a plurality of DC busses coupled to the converter and configured to receive the DC power from the converter, an inverter coupled to the plurality of DC busses and configured to convert the DC power from the plurality of DC busses into output AC power and provide the output AC power to the output, and a controller configured to operate the inverter, during a positive half-period of the line cycle, in a first mode of operation to provide a positive output voltage to the output, in a second mode of operation to provide a zero output voltage to the output, and a third mode of operation to provide a negative output voltage to the output.

21 Claims, 12 Drawing Sheets

(51) Int. Cl.
*H02M 7/5387* (2007.01)
*H02M 1/00* (2006.01)

(56) References Cited

FOREIGN PATENT DOCUMENTS

| WO | 2015094233 A1 | | 6/2015 |
|---|---|---|---|
| WO | WO 2015/094233 | * | 6/2015 |
| WO | 2015199718 A1 | | 12/2015 |
| WO | WO 2015/199718 | * | 12/2015 |

* cited by examiner

MULTISTATE PWM COMMAND FOR 3 LEVELS INVERTERS

BACKGROUND OF THE INVENTION

1. Field of Invention

The present invention relates generally to systems and methods for controlling an uninterruptible power supply (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an Uninterruptible Power Supply (UPS) system comprising an input configured to be coupled to an AC source and to receive input AC power from the AC source, an output configured to provide output AC power to a load, the output AC power having a positive average output voltage level during a positive half-period of a line cycle and a negative average output voltage level during a negative half-period of the line cycle, a converter coupled to the input and configured to convert the input power into DC power, a plurality of DC busses coupled to the converter and configured to receive the DC power from the converter, an inverter coupled to the plurality of DC busses and configured to convert the DC power from the plurality of DC busses into the output AC power and provide the output AC power to the output, and a controller configured to operate the inverter, during the positive half-period of the line cycle, in a first mode of operation to provide a positive output voltage to the output, in a second mode of operation to provide a zero output voltage to the output, and a third mode of operation to provide a negative output voltage to the output.

According to one embodiment, the controller is further configured to operate the inverter, during the negative half-period of the line cycle, in a fourth mode of operation to provide a negative output voltage to the output, in a fifth mode of operation to provide a zero output voltage to the output, and a sixth mode of operation to provide a positive output voltage to the output. In one embodiment, the inverter is based on an NPC-2 topology. In another embodiment, the plurality of DC busses includes a positive DC bus configured to maintain a positive DC voltage level, a mid-point DC bus, and a negative DC bus configured to maintain a negative DC voltage level, and the inverter comprises a plurality of switches coupled between the plurality of DC busses.

According to another embodiment, the plurality of switches includes a first switch coupled between the positive DC bus and the output, a second switch coupled to the mid-point bus, a third switch coupled between the second switch and the output, and a fourth switch coupled between the negative DC bus and the output. In one embodiment, in operating the inverter in the first mode of operation, the controller is further configured to operate the first switch to close, for a first period of time, to couple the positive DC bus to the output and provide the positive output voltage to the output. In another embodiment, in operating the inverter in the second mode of operation, the controller is further configured to operate the second switch to close, for a second period of time, to couple the mid-point bus to the output and provide the zero output voltage to the output. In one embodiment, in operating the inverter in the third mode of operation, the controller is further configured to operate the fourth switch to close, for a third period of time, to couple the negative DC bus to the output and provide the negative output voltage to the output.

According to one embodiment, the controller includes a calculation module configured to calculate a coefficient k based on a conduction duration time of the second switch, and the controller is further configured to define the first, second, and third periods of time based on the coefficient k. In one embodiment, the controller is further configured to define the first, second, and third periods of time to symmetrically distribute the first, second, and third modes of operation across the positive half-period of the line cycle.

According to another embodiment, in operating the inverter in the fourth mode of operation, the controller is further configured to operate the fourth switch to close to couple the negative DC bus to the output and provide the negative output voltage to the output. In one embodiment, in operating the inverter in the fifth mode of operation, the controller is further configured to operate the second switch to close to couple the mid-point bus to the output and provide the zero output voltage to the output. In another embodiment, in operating the inverter in the sixth mode of operation, the controller is further configured to operate the first switch to close to couple the positive DC bus to the output and provide the positive output voltage to the output.

Another aspect of the invention is directed to a method for operating a UPS comprising an input configured to be coupled to a power source, an output, a plurality of DC buses including a positive DC bus, a mid-point DC bus, and a negative DC bus, and an inverter coupled to the plurality of DC busses, the method comprising receiving input power from the power source, maintaining a positive DC voltage level on the positive DC bus, maintaining a negative DC voltage level on the negative DC bus, converting, with the inverter, DC power from the plurality of DC buses into output AC power, the output AC power having a positive average output voltage level during a positive half-period of a line cycle and a negative average output voltage level during a negative half-period of the line cycle, providing the output AC power to the output, and operating the inverter, during the positive half-period of the line cycle, in a first mode of operation to provide a positive output voltage to the output, in a second mode of operation to provide a zero output voltage to the output, and a third mode of operation to provide a negative output voltage to the output.

According to one embodiment, the inverter comprises a plurality of switches coupled between the plurality of DC busses, and wherein operating the inverter in the first mode of operation includes operating the plurality of switches, for a first period of time, to couple the positive DC bus to the output and provide the positive output voltage to the output. In another embodiment, operating the inverter in the second mode of operation includes operating the plurality of switches, for a second period of time, to couple the midpoint bus to the output and provide the zero output voltage to the output. In one embodiment, operating the inverter in the third mode of operation includes operating the plurality of switches, for a third period of time, to couple the negative DC bus to the output and provide the negative output voltage to the output.

According to another embodiment, the method further comprises calculating a coefficient k based on a conduction duration time of at least one of the plurality of switches, and defining the first, second, and third periods of time based on the coefficient k. In one embodiment, the method further comprises operating the inverter, during the negative half-period of the line cycle, in a fourth mode of operation to provide a positive output voltage to the output, in a fifth mode of operation to provide a zero output voltage to the output, and a sixth mode of operation to provide a negative output voltage to the output.

At least one aspect of the invention is directed to an Uninterruptible Power Supply (UPS) system comprising an input configured to be coupled to an AC source and to receive input AC power from the AC source, an output configured to provide output AC power to a load, the output AC power having a positive average output voltage level during a positive half-period of a line cycle and a negative average output voltage level during a negative half-period of the line cycle, a converter coupled to the input and configured to convert the input power into DC power, a plurality of DC busses coupled to the converter and configured to receive the DC power from the converter, and means for converting the DC power from the plurality of DC buses into the output AC power while balancing thermal losses during a short circuit condition at the output.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
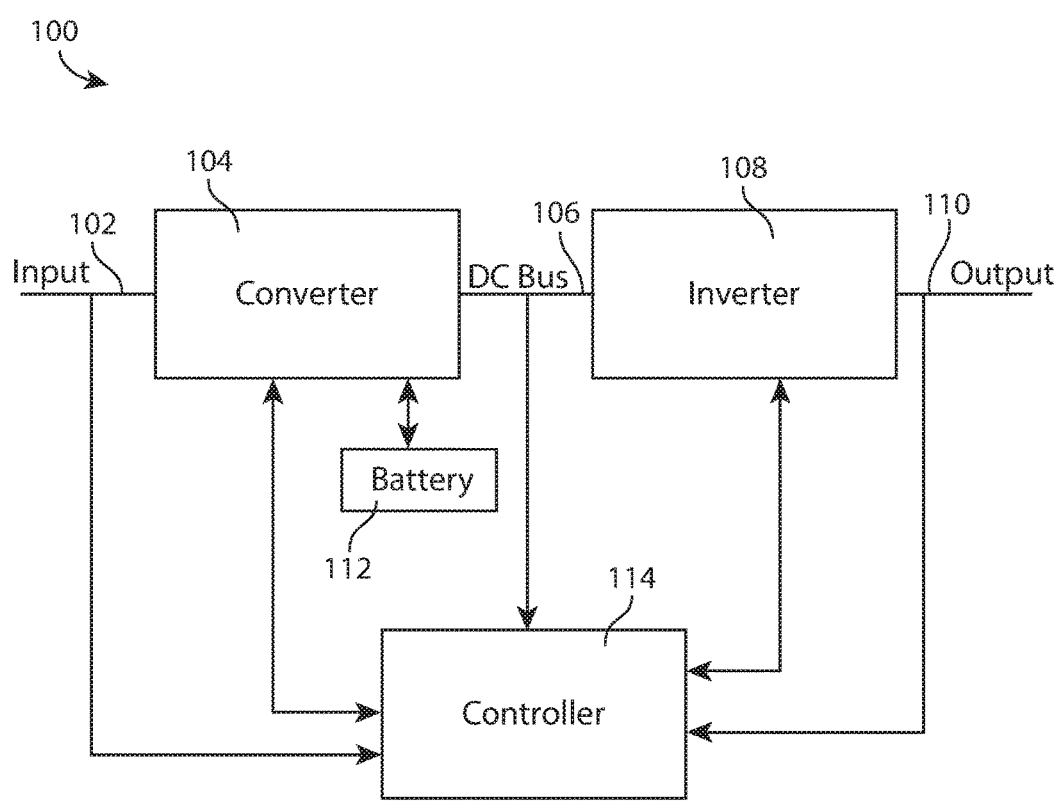
FIG. 1 is a block diagram of an online UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. A conventional online UPS rectifies input AC power provided by an electric utility using a Power Factor Correction circuit (PFC) to provide DC power to a DC bus. The rectified DC power on the DC Bus is typically used to charge a battery while mains power is available. In the absence of mains power, the battery discharges and provides DC power to the DC bus. From the DC power on the DC bus, an inverter generates an AC output voltage that is provided to a load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

One common approach to improve the efficiency of a UPS is to utilize multi-level power converters within the UPS. One type of multi-level power converter that is typically used in a UPS is a 3-level inverter that is able to switch between three voltage levels: a positive DC voltage level, a mid-point zero voltage level, and a negative DC voltage level. Such 3-level inverters generally combine significant efficiency improvement with reasonable complexity. However, 3-level inverters also introduce new design constraints. For example, the output voltage and output current waveforms of a 3-level inverter may become unreliable when the output voltage is close to zero as a 3-level inverter cannot typically provide 0V on its output. In addition, the operation of a 3-level inverter at max current and low voltage (i.e., corresponding to a short-circuit situation on the inverter's output) may place a very high thermal constraint on the transistors of the 3-level inverter.

In at least one embodiment, a 3-level inverter system and method is provided that balances the thermal losses between transistors during a short circuit on the AC side of the inverter, improves inverter performance, and allows the 3-level inverter to generate a zero voltage on the AC side of the inverter.

FIG. 1 is a block diagram of an online UPS 100 according to one aspect of the present invention. The UPS 100 includes an input 102, a converter 104, a DC bus 106, an inverter 108, an output 110, a battery 112, and a controller 114. The input 102 is coupled to the converter 104. The DC bus 106 is coupled between the converter 104 and the inverter 108. The output 110 is coupled to the inverter 108. The controller 114 is coupled to the input 102, the output 110, the converter 104, the DC bus 106, and the inverter 108. The battery is coupled to the converter 104.

The input 102 is configured to be coupled to an AC mains power source and to receive input AC power having an input voltage level. The controller 114 monitors the input AC power received by the input 102 and is configured to operate the UPS 100 in different modes of operation based on the status of the input AC power received by the input 102. When AC power provided to the input 102 is acceptable (i.e., above an input power threshold), the controller 114 operates the UPS 100 in a normal mode of operation. In the normal mode of operation, AC power from the input 102 is provided to the converter 104. According to one embodiment, the converter 104 is a Power Factor Correction converter 104; however, in other embodiments, other types of converters may be utilized.

The controller 114 operates the converter 104 to convert the AC power into DC power and provide the DC power to the DC bus 106. In one embodiment, DC power is also provided from the converter 104 to the battery 112 to charge the battery 112. In another embodiment, DC power from the DC bus 106 is provided to the battery 112 via a DC/DC converter to charge the battery 112. In the normal mode of operation, the inverter 108 receives DC power from the DC bus 106, and the controller 114 operates the inverter 108 to convert the DC power into regulated AC power and provide regulated AC power to a load coupled to the output 110.

When AC power provided to the input 102 is not acceptable (i.e., below an input power threshold), the controller 114 operates the UPS 100 in a backup mode of operation. In the backup mode of operation, DC power from the battery 112 is regulated (e.g., by the converter 104 or a DC/DC converter coupled to the battery 112) and provided to the DC bus 106. The inverter 108 receives the DC power from the DC bus 106, and the controller 114 operates the inverter 108 to convert the DC power into regulated AC power and provide the regulated AC power to the output 110.

Figure 2:
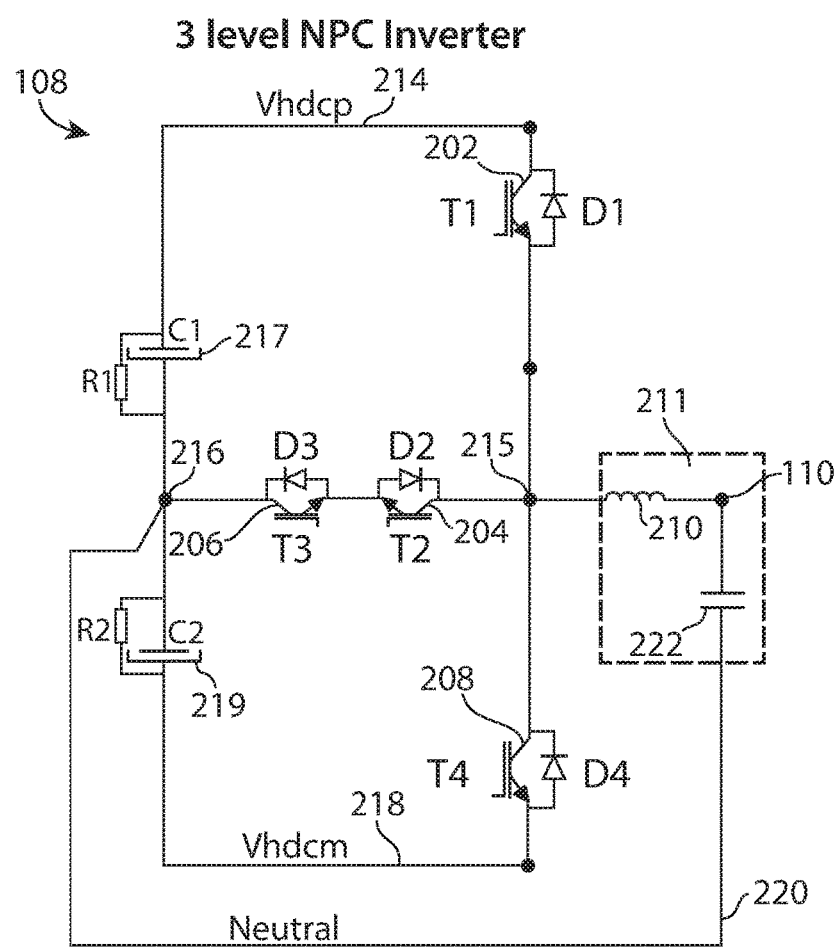
FIG. 2 is a schematic diagram of an inverter according to aspects described herein.

FIG. 2 is a schematic diagram of the inverter 108 according to at least one embodiment described herein. The inverter 108 is a three level inverter. For example, in one embodiment as shown in FIG. 2, the inverter 108 is configured based on an NPC (Neutral Point Clamped)-2 topology (e.g., a T-type inverter). However, in other embodiments, the inverter 108 is configured based on another appropriate 3-level inverter topology (e.g., NPC-1 topology).

As shown in FIG. 2, the inverter 108 includes a plurality of switches including a first switch (T1) 202, a second switch (T2) 204, a third switch (T3) 206, and a fourth switch (T4) 208. The inverter 108 also includes an LC filter 211, a positive bus 214, a mid-point bus 216, a negative bus 218, a neutral line 220, a first capacitor 217, and a second capacitor 219. The LC filter 211 includes an output inductor 210 and an output capacitor 222. In one embodiment, each of the plurality of switches 202, 204, 206, 208 is an Insulated Gate Bipolar Transistor (IGBT); however, in other embodiments, each switch 202, 204, 206, 208 can be another appropriate type of switch and/or transistor (e.g., a Metal-Oxide-Semiconductor Field-Effect Transistor (MOSFET)). According to at least one embodiment, each switch 202, 204, 206, 208 includes a diode connected in anti-parallel to the switch. In at least one embodiment, the diode is the intrinsic body-diode of a MOSFET or a co-pack diode of an IGBT.

According to at least one embodiment as shown in FIG. 2, the collector of the first switch (T1) 202 is coupled to the positive DC-bus 214 and the emitter of the first switch (T1) 202 is coupled to a common point 215. The common point 215 is coupled to a first end of the inductor 210. The collector of the fourth switch (T4) 208 is coupled to the common point 215. The emitter of the fourth switch (T4) 208 is coupled to the negative DC-bus 218. The collector of the third switch (T3) 206 is coupled to the mid-point bus 216 and the emitter of the third switch (T3) 206 is coupled to the emitter of the second switch (T2) 204. The collector of the second switch (T2) 204 is coupled to the common point 215. The second end of the inductor 210 is coupled to the output 110 of the UPS 100. According to at least one embodiment, the output 110 is also coupled to a neutral line 220 via the output capacitor 222. The neutral line is also coupled to the mid-point bus 216. The mid-point bus 216 is also coupled to the positive DC bus 214 via the first capacitor 217 and is coupled to the negative DC bus 218 via the second capacitor 219. The controller 114 is coupled to the gate of each switch 202, 204, 206, 208 and is configured to provide control signals to the gate of each switch 202, 204, 206, 208.

Figure 3:
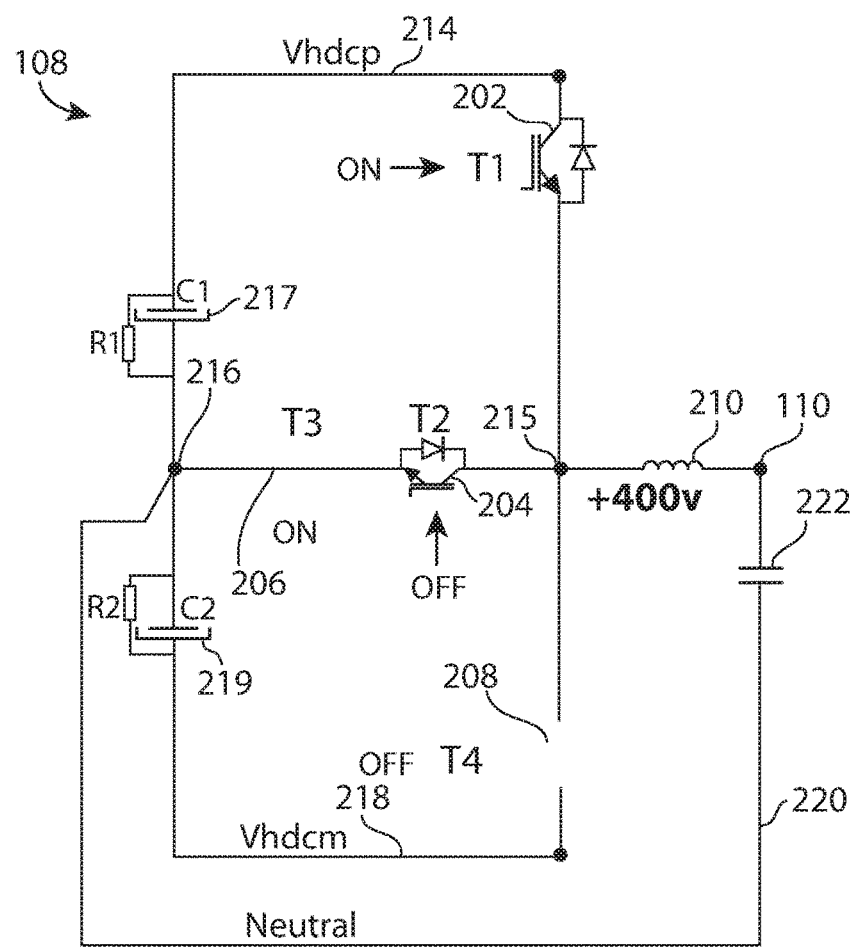
FIG. 3 is a schematic diagram of an inverter operating in a first mode of operation according to aspects described herein.
Figure 4:
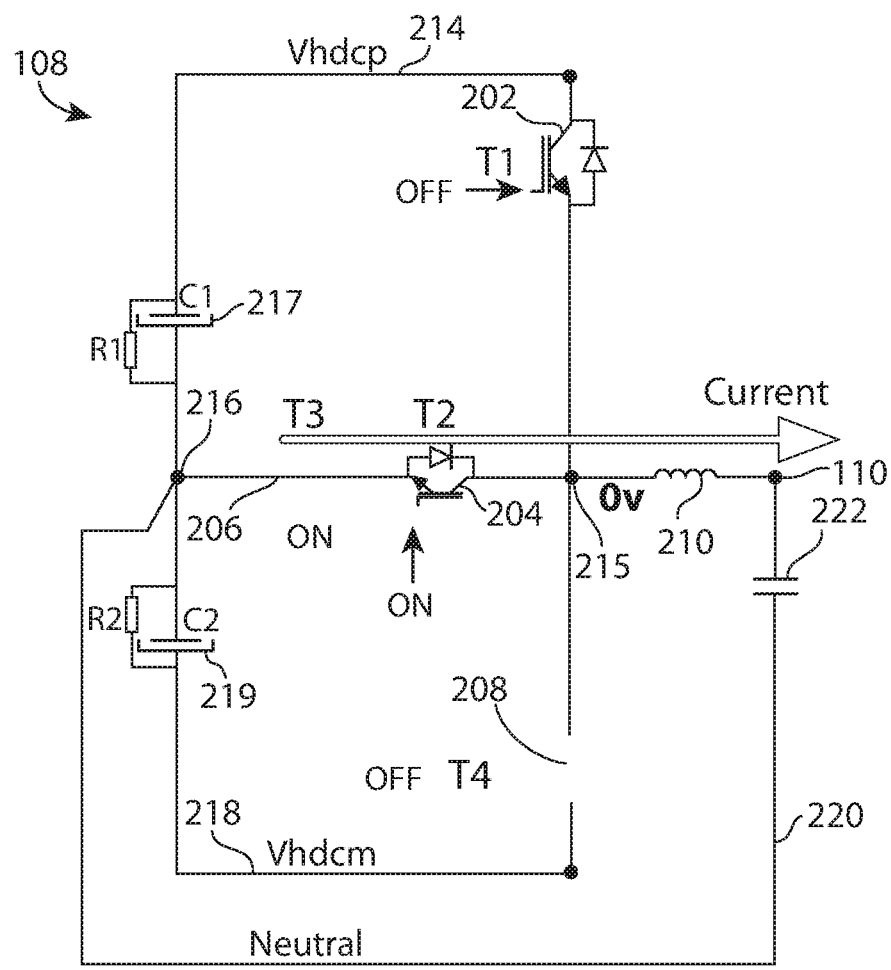
FIG. 4 is a schematic diagram of an inverter operating in a second mode of operation according to aspects described herein.
Figure 5:
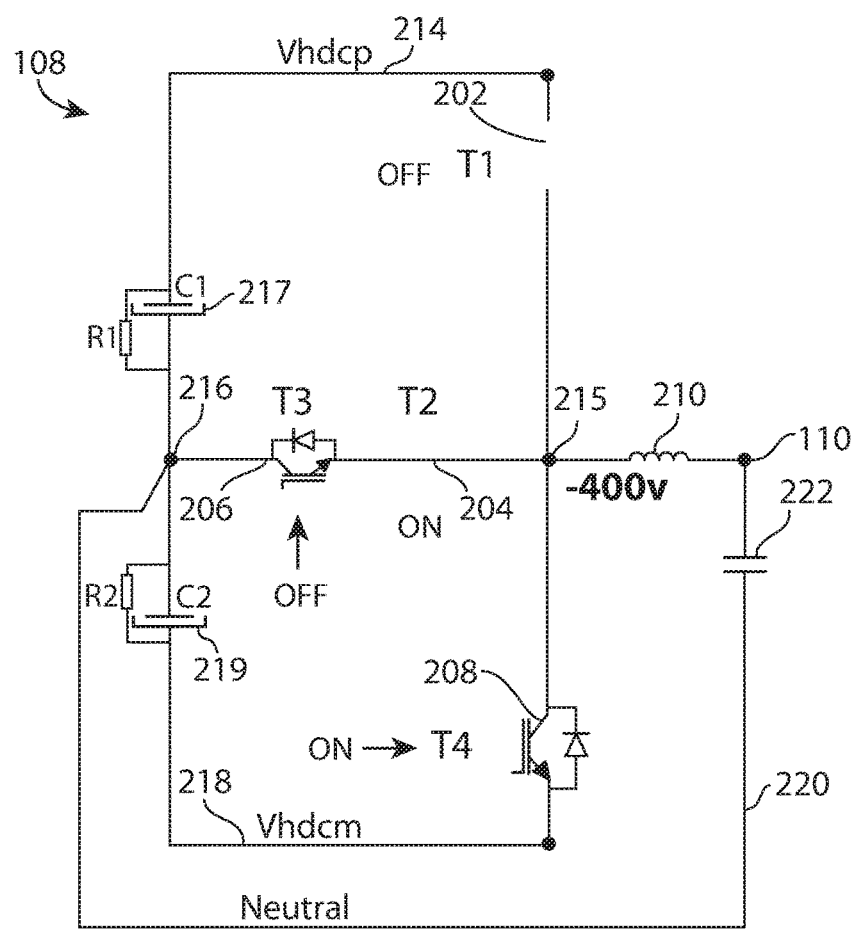
FIG. 5 is a schematic diagram of an inverter operating in a third mode of operation according to aspects described herein.
Figure 6:
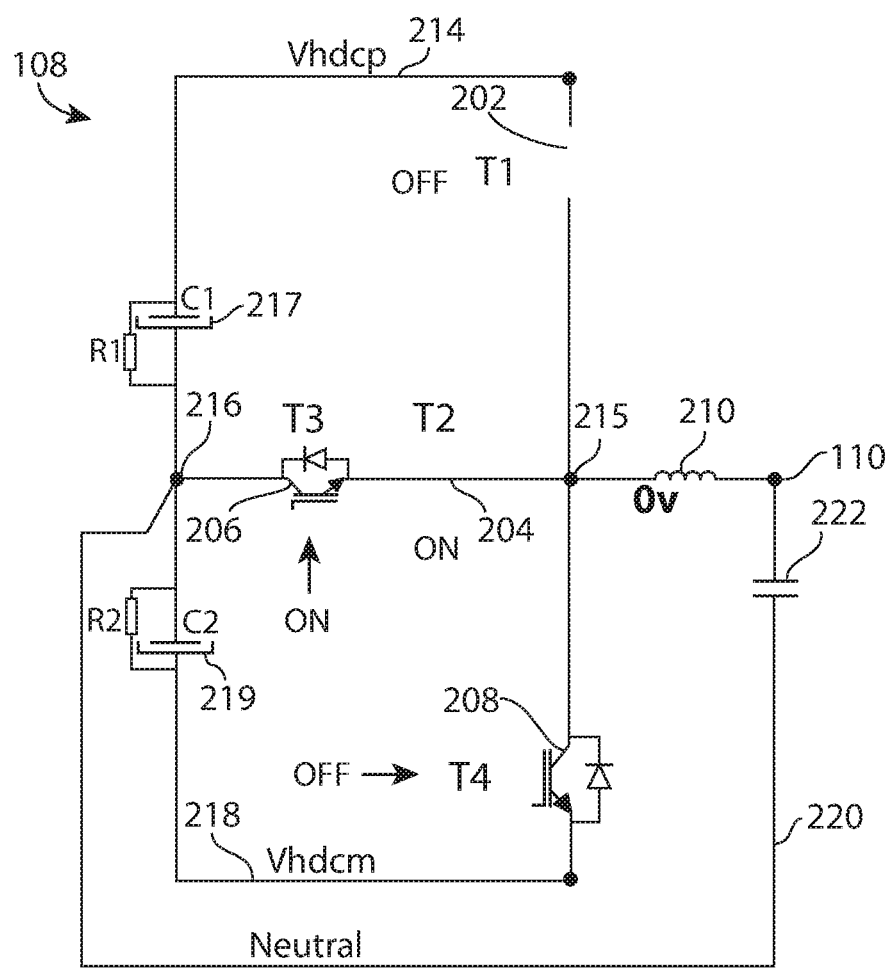
FIG. 6 is a schematic diagram of an inverter operating in a fourth mode of operation according to aspects described herein.
Figure 7:
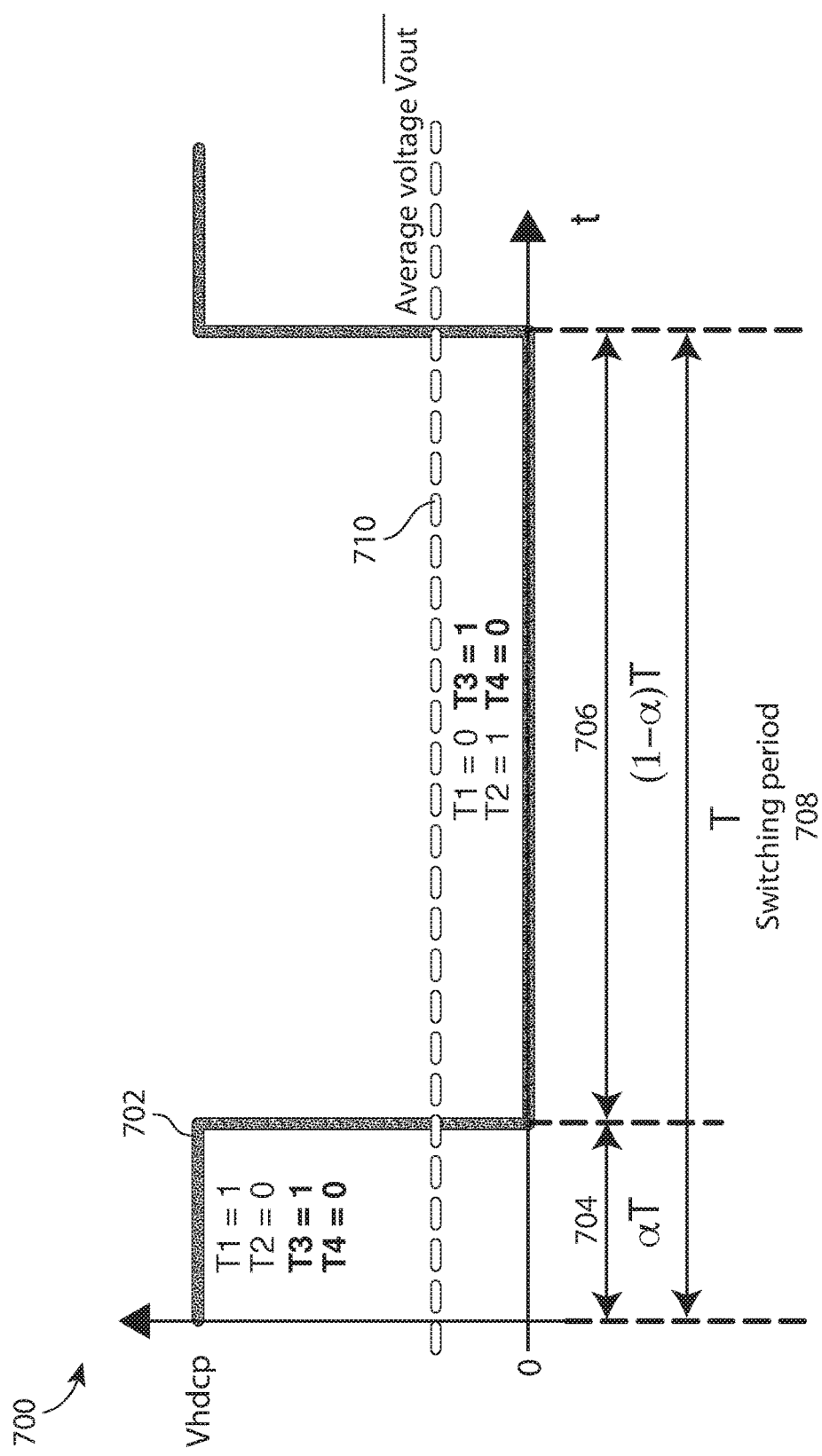
FIG. 7 is a graph illustrating output voltage of an inverter during a positive half-period of a line cycle according to aspects described herein.

Operation of the inverter is discussed in greater detail below with reference to FIGS. 3-7. FIGS. 3-6 are schematic diagrams of the inverter 108 operating in different modes of operation. For example, FIG. 3 is a schematic diagram of the inverter 108 operating in a first mode of operation, FIG. 4 is a schematic diagram of the inverter 108 operating in a second mode of operation, FIG. 5 is a schematic diagram of the inverter 108 operating in a third mode of operation and FIG. 6 is a schematic diagram of the inverter 108 operating in a fourth mode of operation. FIG. 7 is a graph 700 including a trace 702 illustrating output voltage of the inverter 108 during a positive half-period of a line cycle according to one embodiment described herein.

As similarly discussed above, in both the normal and backup modes of operation, the controller 114 operates the inverter 108 to convert DC power received on the busses 214, 218 from the converter 104 into regulated AC power and provide regulated AC power to the output 110. According to one embodiment, during a positive half-period of a line cycle, the controller 114 operates the inverter 108 in a first mode of operation and a second mode of operation to provide regulated AC power at a desired level to the output 110.

FIG. 3 is a schematic diagram of the inverter 108 operating in the first mode of operation during a positive half-period of a line cycle. In the first mode of operation, the controller 114 operates the third switch (T3) 206 to be in a closed state, the fourth switch (T4) 208 to be in an open state, the second switch (T2) 204 to be in an open state, and the first switch (T1) 202 to be in a closed state. Once the third switch (T3) 206 and the first switch (T1) 202 are closed and the fourth switch (T4) 208 and the second switch (T2) 204 are opened, the positive bus 214 is coupled to the common point 215 and a desired voltage (e.g., 400V) is generated at the common point 215. For example, as shown in FIG. 7, during a first period of time 704 defined by αT (where α is the current duty cycle, e.g., from 0 to 1, and T is the switching period 708, e.g., from 30 μs to 200 μs) the third switch (T3) 206 and the first switch (T1) 202 are closed, the fourth switch (T4) 208 and the second switch (T2) 204 are opened, the positive bus 214 is coupled to the common point 215, and a positive voltage 702 on the positive bus 214 (Vhdcp), e.g., 400V, is generated at the common point 215.

FIG. 4 is a schematic diagram of the inverter 108 operating in the second mode of operation during a positive half-period of a line cycle. In the second mode of operation, the controller 114 operates the third switch (T3) 206 to be in a closed state, the fourth switch (T4) 208 to be in an open state, the second switch (T2) 204 to be in a closed state, and the first switch (T1) 202 to be in an open state. Once the third switch (T3) 206 and the second switch (T2) 202 are closed and the fourth switch (T4) 208 and the first switch (T1) 202 are opened, the mid-point bus 216 is coupled to the common point 215 and the voltage at the common point 215 goes to zero. For example, as shown in FIG. 7, during a second period of time 706 defined by (1−α)T, the third switch (T3) 206 and the second switch (T2) 204 are closed, the fourth switch (T4) 208 and the first switch (T1) 202 are opened, the mid-point bus 216 is coupled to the common point 215, and the voltage at the common point 215 goes to zero.

Over the positive half-period of the line cycle, the output inductor 210 and the output capacitor 222 of the LC filter 211 operate to filter out voltage variations at the common point 215 so that a positive average of the voltage at the common point 215 over the switching period (T) 708 is provided to the output 110. More specifically, as further shown in FIG. 7, by operating the inverter 108 in the first and second modes of operation discussed above, the controller 114 operates the inverter 108 to generate an average output voltage 710 (e.g., as shown in FIG. 7) over the switching period 708. The average output voltage over the switching period 708 can be represented as:

$$\overline{Vout} = \alpha * T * Vhdcp + (1-\alpha) * T * 0.$$

Accordingly, in a simplified expression, the average output voltage can be represented as:

$$\overline{Vout} = \alpha * T * Vhdcp$$

Similarly, during a negative half-period of a line cycle, the controller 114 operates the inverter 108 in a third mode of operation and a fourth mode of operation to provide regulated AC power at a desired level to the output 110. For example, FIG. 5 is a schematic diagram of the inverter 108 operating in the third mode of operation during a negative half-period of a line cycle. In the third mode of operation, the controller 114 operates the third switch (T3) 206 to be in an open state, the fourth switch (T4) 208 to be in a closed state, the second switch (T2) 204 to be in a closed state, and the first switch (T1) 202 to be in an open state. Once the third switch (T3) 206 and the first switch (T1) 202 are opened and the fourth switch (T4) 208 and the second switch (T2) 204 are closed, the negative bus 218 is coupled to the common point 215 and a negative voltage (Vhdcm) on the negative bus 218, e.g., −400V, is also generated at the common point 215.

FIG. 6 is a schematic diagram of the inverter 108 operating in the fourth mode of operation. In the fourth mode of operation, the controller 114 operates the third switch (T3) 206 to be in a closed state, the fourth switch (T4) 208 to be in an open state, the second switch (T2) 204 to be in a closed state, and the first switch (T1) 202 to be in an open state. Once the third switch (T3) 206 and the second switch (T2) 202 are closed and the fourth switch (T4) 208 and the first switch (T1) 202 are opened, the mid-point bus 216 is coupled to the common point 215 and the voltage at the common point 215 goes to zero.

Over the negative half-period of the line cycle, the output inductor 210 and the output capacitor 222 of the LC filter 211 operate to filter out voltage variations at the common point 215 so that a negative average of the voltage at the common point 215 over the switching period (T) 708 is provided to the output 110. More specifically, as similarly discussed above with respect to the positive half-period of a line cycle, the average output voltage of the inverter 108 over a negative half-period (T) can be expressed as:

$$\overline{Vout} = \alpha * T * Vhdcm.$$

In a normal mode of operation, the controller 114 operates the inverter 108 to generate AC power at the output 110 having a sinewave output voltage signal. For example, as described above and shown in FIG. 7, the controller 114 operates the inverter 108 in the first and second modes of operation to generate a positive half-period of the sinewave output voltage signal having a positive average output voltage level and in the third and fourth modes of operation to generate a negative half-period of the sinewave output voltage signal having a negative average output voltage level. In the normal mode of operation, the duty cycle (α) of the inverter 108 is defined as a sinewave that varies between 0 and 1 because the output voltage of the inverter 108 is also a sinewave. Also in the normal mode of operation, for example as shown in FIG. 7, the time spent in the first mode of operation (i.e., during the first period of time 704) is substantially the same as the time spent in the second mode of operation (i.e., during the second period of time 706).

In a short circuit condition (e.g., when a short circuit exists at the output 110), the output voltage of the inverter 108 is close to zero and the output current of the inverter is at a maximum value. In such a short circuit condition, the duty cycle (α) of the inverter 108 is close to a square wave and alternates between relatively small peak values, for example, between +0.1 and −0.1. During the short circuit mode of operation, the inverter 108 spends a majority of its time in the second and fourth modes of operation (i.e., where switches T2 204 and T3 206 are closed) and the conduction times of switches T2 204 and T3 206 are relatively long. As a short circuit condition can exist for a relatively long period of time (e.g., from 0.1 s to 1 s), the output current of the inverter 108 is at a maximum value during a short circuit condition, and the output current passes mainly through switches T2 204 and T3 206 during a short circuit condition, the losses and temperature of switches T2 204 and T3 206 can be relatively high during a short circuit condition.

In at least one embodiment, the inverter 108 is operated by the controller 114 in fifth and sixth modes of operation to better distribute the current (and losses) between the switches of the inverter 108. By operating the inverter 108 in the first, second, third, fourth, fifth, and sixth modes of operation, the controller 114 operates the inverter 108 to generate the same average output voltage during each half-period of a line cycle (as compared to when the controller 114 only operates the inverter in the first, second, third, and fourth modes of operation) but with a mix of three output levels (+Vhdcp, 0, −Vhdcm) during each half-period, instead of only 2. By replacing a portion of the second and fourth modes of operation of the inverter 108 (e.g., where the output voltage of the inverter 108 is zero) by an equal duration at both +Vhdcp and −Vhdcm (i.e., in fifth and sixth modes of operation) during each half-period of a line cycle, the losses and thermal issues of the inverter 108 can be reduced.

Figure 8:
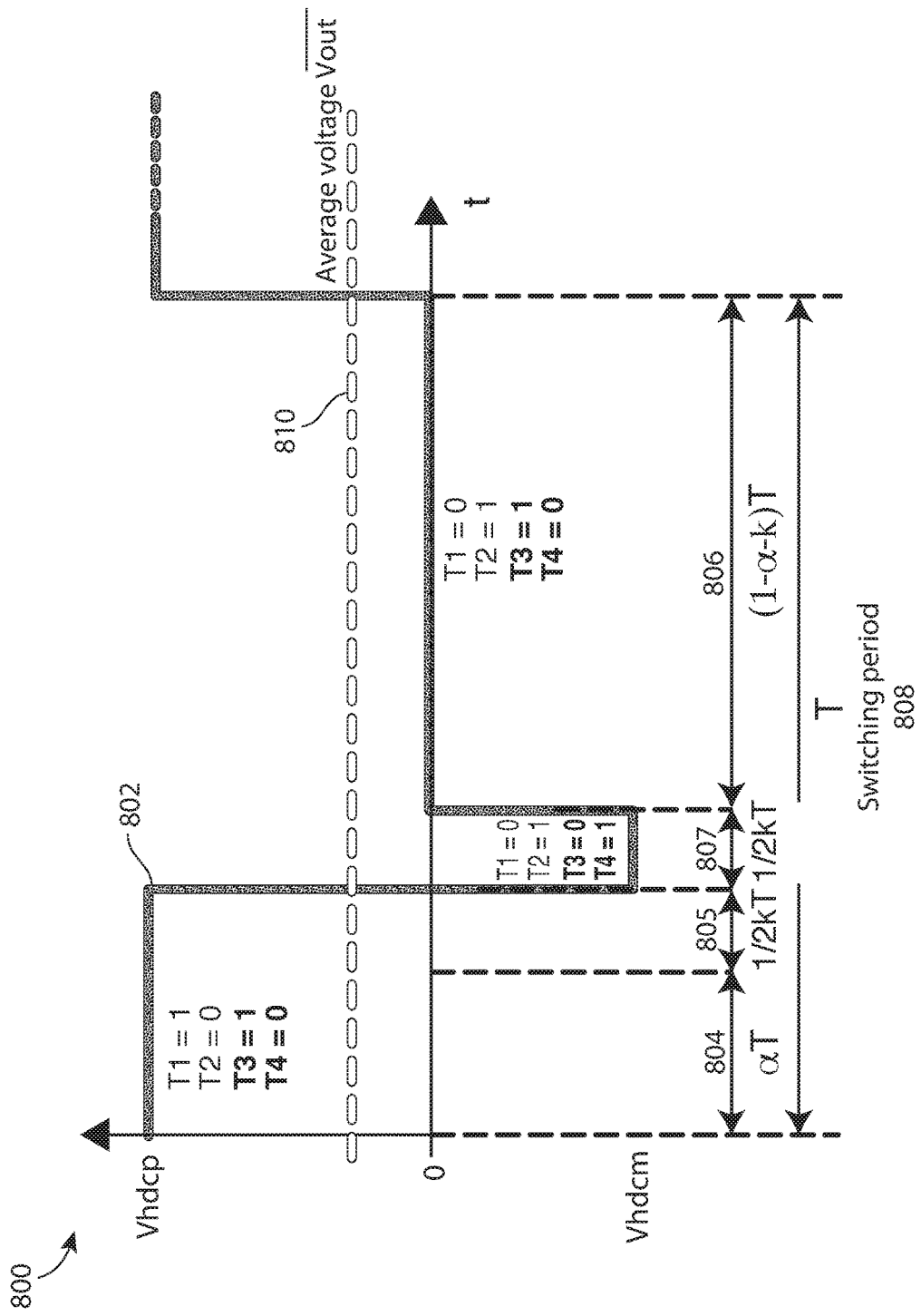
FIG. 8 is a graph illustrating output voltage of an inverter during a positive half-period of a line cycle according to aspects described herein.

FIG. 8 is a graph 800 including a trace 802 illustrating output voltage of the inverter 108 during a positive half-period of a line cycle according to one embodiment described herein where the controller 114 operates the inverter 108 in the first, second, and fifth modes of operation. The operation of the inverter 108 illustrated in FIG. 8 is substantially the same as the operation of the inverter 108 illustrated in FIG. 7 (with respect to the first and second modes of operation), except that as illustrated in FIG. 8, the inverter 108 is operated to replace a portion of the second mode of operation by an equal duration at +Vhdcp and −Vhdcm (i.e., in a fifth mode of operation).

More specifically, as described above, the average output voltage of the inverter 108 over a positive half-period (T) can be expressed as:

$$\overline{Vout} = \alpha * T * Vhdcp + (1-\alpha) * T * 0.$$

Accordingly, in a simplified expression, the average output voltage can be represented as:

$$\overline{Vout} = \alpha * T * Vhdcp.$$

According to one embodiment, to replace a portion of the second mode of operation by an equal duration at +Vhdcp and −Vhdcm, the controller 114 implements a new hybrid modulation index k, where 0<k<1−α. kT is a new step in the switching period (T) where the low level step (i.e., the second mode of operation) is replaced by a combination of +Vhdcp and −Vhdcm (e.g., (½) kT*Vhdcp+(½) kT*Vhdcm). As such, the average output voltage of the inverter 108 becomes:

$$\overline{Vout} = \alpha * T * Vhdcp + \frac{1}{2}k * T * Vhdcp + \frac{1}{2}k * T * Vhdcm + (1-\alpha-k) * T * 0.$$

The average value of (½) kT*Vhdcp+(½) kT*Vhdcm is zero and the total time at 0 is then:

$$\frac{1}{2}k * T + \frac{1}{2}k * T + (1-\alpha-k) * T = (1-\alpha).$$

As such, the average output voltage 810 of the inverter 108 over a positive half-period (T) has not changed. The average output voltage equation can be simplified:

$$\overline{Vout} = \left(\alpha + \frac{1}{2}k\right) \cdot T \cdot Vhdcp + \frac{1}{2}k \cdot T \cdot Vhdcm.$$

Based on the new average output voltage equation described above, the controller 114 operates the inverter 108 to introduce the new step (kT) in the switching period (T). More specifically, as shown in FIG. 8, during a first period of time 804 (e.g., the first mode of operation discussed above) defined by αT (where α is the current duty cycle, e.g., from 0 to 1, and T is the switching period 808, e.g., from 30 μs to 200 μs) the third switch (T3) 206 and the first switch (T1) 202 are closed, the fourth switch (T4) 208 and the second switch (T2) 204 are opened, the positive bus 214 is coupled to the common point 215, and a positive voltage 802 on the positive bus 214 (Vhdcp), e.g., 400V, is also generated at the common point 215. During a second period of time 806 (e.g., a second mode of operation as discussed above) defined by (1−α−k)T, the third switch (T3) 206 and the second switch (T2) 204 are closed, the fourth switch (T4) 208 and the first switch (T1) 202 are opened, the mid-point bus 216 is coupled to the common point 215, and the voltage on the common point 215 goes to zero.

During a third period of time 805 (e.g., in a fifth mode of operation as discussed above), defined by (½)kT, the controller 114 operates the inverter 108 to replace the low level output voltage step (i.e., the second mode of operation with a common point 215 voltage of 0V) with the positive level common point 215 voltage step (i.e., the first mode of operation with a common point 215 voltage of, for example, 400V). The controller 114 drives the output voltage 802 of the inverter to the positive level step by closing the first switch (T1) 202 and the third switch (T3) 206 and opening the fourth switch (T4) 208 and the second switch (T2) 204. During a fourth period of time 807 (e.g., also in a fifth mode of operation as discussed above), defined by (½)kT, the controller 114 operates the inverter 108 to replace the low level common point 215 voltage step (i.e., the second mode of operation with common point 215 voltage of 0V) with the negative level common point 215 voltage step (e.g., −400V). The controller 114 drives the common point 215 voltage level of the inverter to the negative level step by opening the first switch (T1) 202 and the third switch (T3) 206 and closing the fourth switch (T4) 208 and the second switch (T2) 204.

According to one embodiment, operation of the inverter 108 during the third period of time 805 (i.e., in the fifth mode of operation) is the same as in the first mode of operation described above and operation of the inverter 108 during the fourth period of time 807 (i.e., in the fifth mode of operation) is the same as in the third mode of operation described above; however, in other embodiments, the inverter 108 may be operated differently in the first, third and fifth modes of operation.

The controller 114 can similarly operate the inverter 108 over a negative half-period of a line cycle to replace a portion of the fourth mode of operation of the inverter 108 by an equal duration at both +Vhdcp and −Vhdcm (i.e., a sixth mode of operation). More specifically, during a first portion of a sixth mode of operation, the controller 114 operates the inverter 108 to replace the low level output voltage step (i.e., the second mode of operation with a common point 215 voltage of 0V) with the positive level common point 215 voltage step (i.e., the first mode of operation with a common point 215 voltage of, for example, 400V). The controller 114 drives the output voltage of the inverter to the positive level step by closing the first switch (T1) 202 and the third switch (T3) 206 and opening the fourth switch (T4) 208 and the second switch (T2) 204. During a second portion of the sixth mode of operation, the controller 114 operates the inverter 108 to replace the low level common point 215 voltage step (i.e., the second mode of operation with common point 215 voltage of 0V) with the negative level common point 215 voltage step (e.g., −400V). The controller 114 drives the common point 215 voltage level of the inverter to the negative level step by opening the first switch (T1) 202 and the third switch (T3) 206 and closing the fourth switch (T4) 208 and the second switch (T2) 204.

According to one embodiment, operation of the inverter 108 during the first portion of the sixth mode of operation is the same as in the first mode of operation described above and operation of the inverter 108 during the second portion of the sixth mode of operation is the same as in the third mode of operation described above; however, in other embodiments, the inverter 108 may be operated differently in the first, third, and sixth modes of operation.

By replacing a portion of the second and fourth modes of operation of the inverter 108 (e.g., where the output voltage of the inverter 108 is zero) by an equal duration at both +Vhdcp and −Vhdcm (i.e., in fifth and sixth modes of operation) during each half-period of a line cycle, the losses and thermal issues that typically result from maximum current passing mainly through switches T2 204 and T3 206 of the inverter 108, for example during a short circuit condition, can be reduced while maintaining the positive and negative average output voltage levels.

According to some embodiments (e.g., as illustrated in FIG. 8), the command pulses transmitted by the controller 114 to each switch 202, 204, 206, 208 in the inverter 108 are not symmetric; however, in at least some embodiments, the symmetry of the command pulses is a desired constraint.

Figure 9:
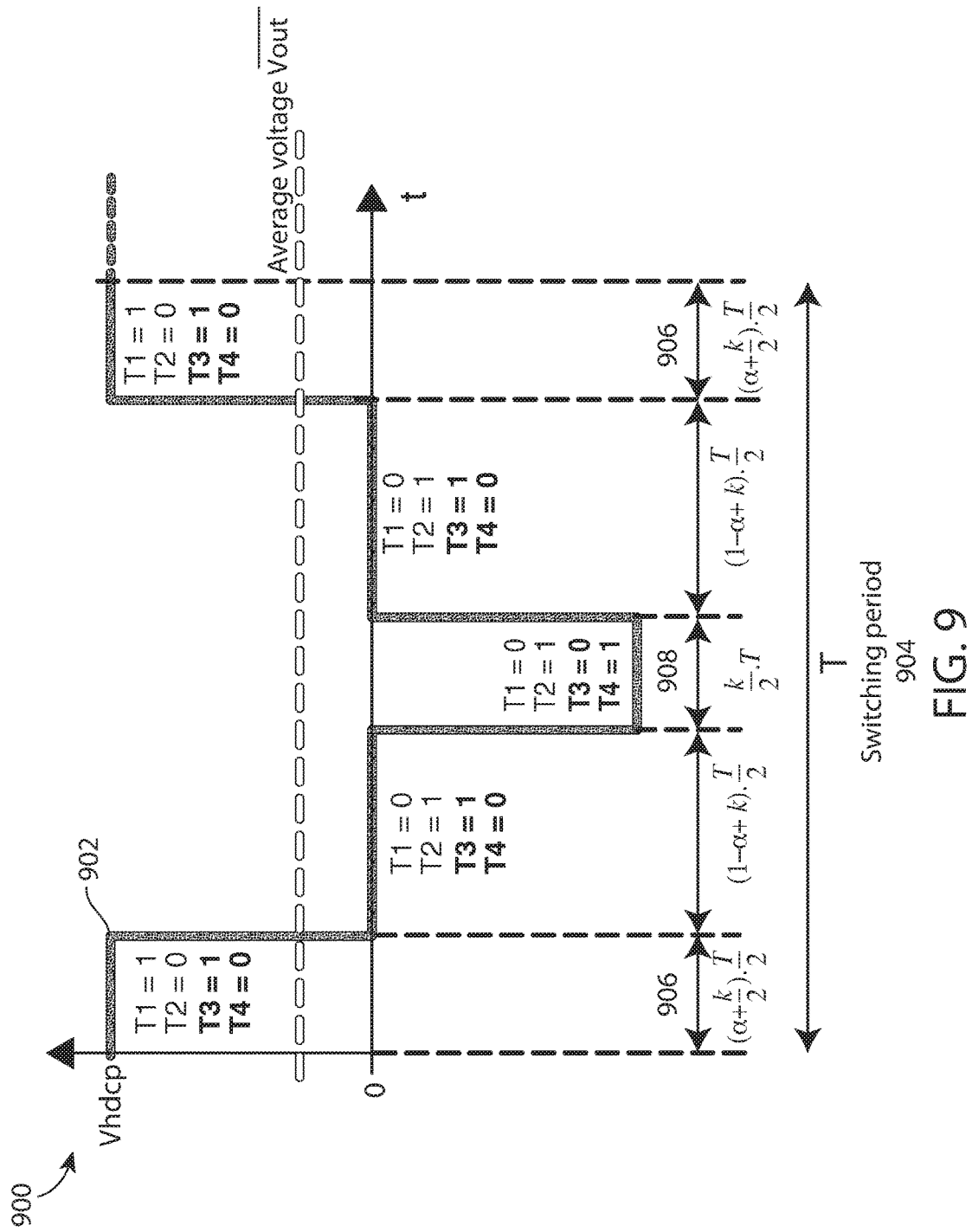
FIG. 9 is a graph illustrating output voltage of an inverter during a positive half-period of a line cycle where symmetric command pulses are transmitted to the inverter from a controller according to aspects described herein.

FIG. 9 is a graph 900 including a trace 902 illustrating output voltage of the inverter 108 during a positive half-period of a line cycle according to one embodiment described herein where symmetric command pulses are transmitted to the inverter 108 from the controller 114. The operation of the inverter 108 illustrated in FIG. 9 is substantially the same as the operation of the inverter 108 illustrated in FIG. 8 (with respect to the first, second, and fifth modes of operation), except that as illustrated in FIG. 9, the inverter 108 is operated in the fifth mode of operation such that symmetric command pulses are transmitted from the controller 114 to the inverter 108. For example, as shown in FIG. 9, in the fifth mode of operation, the periods of time at which the inverter 108 is operated at +Vhdcp and −Vhdcm (to replace a portion of the second mode of operation of the inverter 108) are evenly distributed across the switching period (T). More specifically, as shown in FIG. 9, the periods of time 906 at which the inverter is operated at +Vhdcp is spread to the beginning and end of the switching period (T) 904, while the period of time 908 at which the inverter is operated at −Vhdcm is located at the middle of the switching period (T) 904. The output voltage 902 pattern illustrated in FIG. 9 has relatively high efficiency as it only includes switching between +Vhdcp and zero and −Vhdcp and zero.

Figure 10:
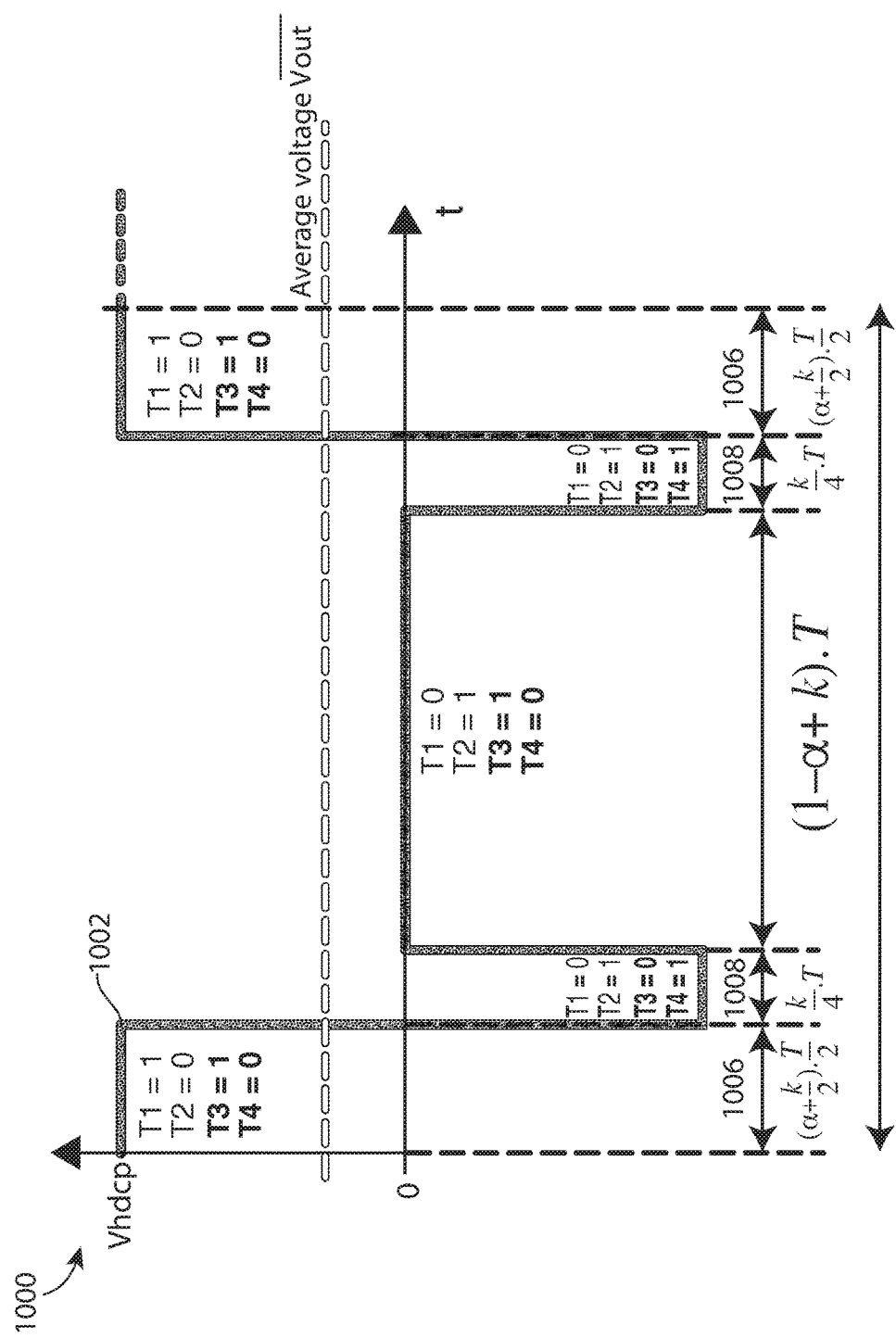
FIG. 10 is a graph illustrating output voltage of an inverter during a positive half-period of a line cycle where symmetric command pulses are transmitted to the inverter from a controller according to aspects described herein.

FIG. 10 is a graph 1000 including a trace 1002 illustrating output voltage of the inverter 108 during a positive half-period of a line cycle according to another embodiment described herein where symmetric command pulses are transmitted to the inverter 108 from the controller 114. The operation of the inverter 108 illustrated in FIG. 10 is substantially the same as the operation of the inverter 108 illustrated in FIG. 8 (with respect to the first, second, and fifth modes of operation), except that as illustrated in FIG. 10, the inverter 108 is operated in the fifth mode of operation such that symmetric command pulses are transmitted from the controller 114 to the inverter 108. For example, as shown in FIG. 10, in the fifth mode of operation, the periods of time at which the inverter 108 is operated at +Vhdcp and −Vhdcm (to replace a portion of the second mode of operation of the inverter 108) are evenly distributed across the switching period (T). More specifically, as shown in FIG. 10, the periods of time 1006 at which the inverter is operated at +Vhdcp is spread to the beginning and end of the switching period (T) 1004, while the periods of time 1008 at which the inverter is operated at −Vhdcm are spread to opposite ends of the switching period (T) 1004. The output voltage 1002 pattern illustrated in FIG. 10 may have higher losses than the pattern shown in FIG. 9 because of the switching between +Vhdcp and −Vhdcp; however, the pattern shown in FIG. 9 may have a lower ripple current RMS value.

As discussed above, one important parameter of the system is the maximum conduction duration ($t_{onmax}$) of the second switch (T2) 204 and the third switch (T3) 206. According to one embodiment, this maximum duration $t_{onmax}$ can be provided as a parameter defined from the thermal sizing of the inverter 108. Also, according to at least one embodiment, the k coefficient described above can be calculated using the following equation:

$$k = \text{Max}\left(0; 1 - \alpha - \frac{t_{onMax}}{T}\right)$$

Figure 11:
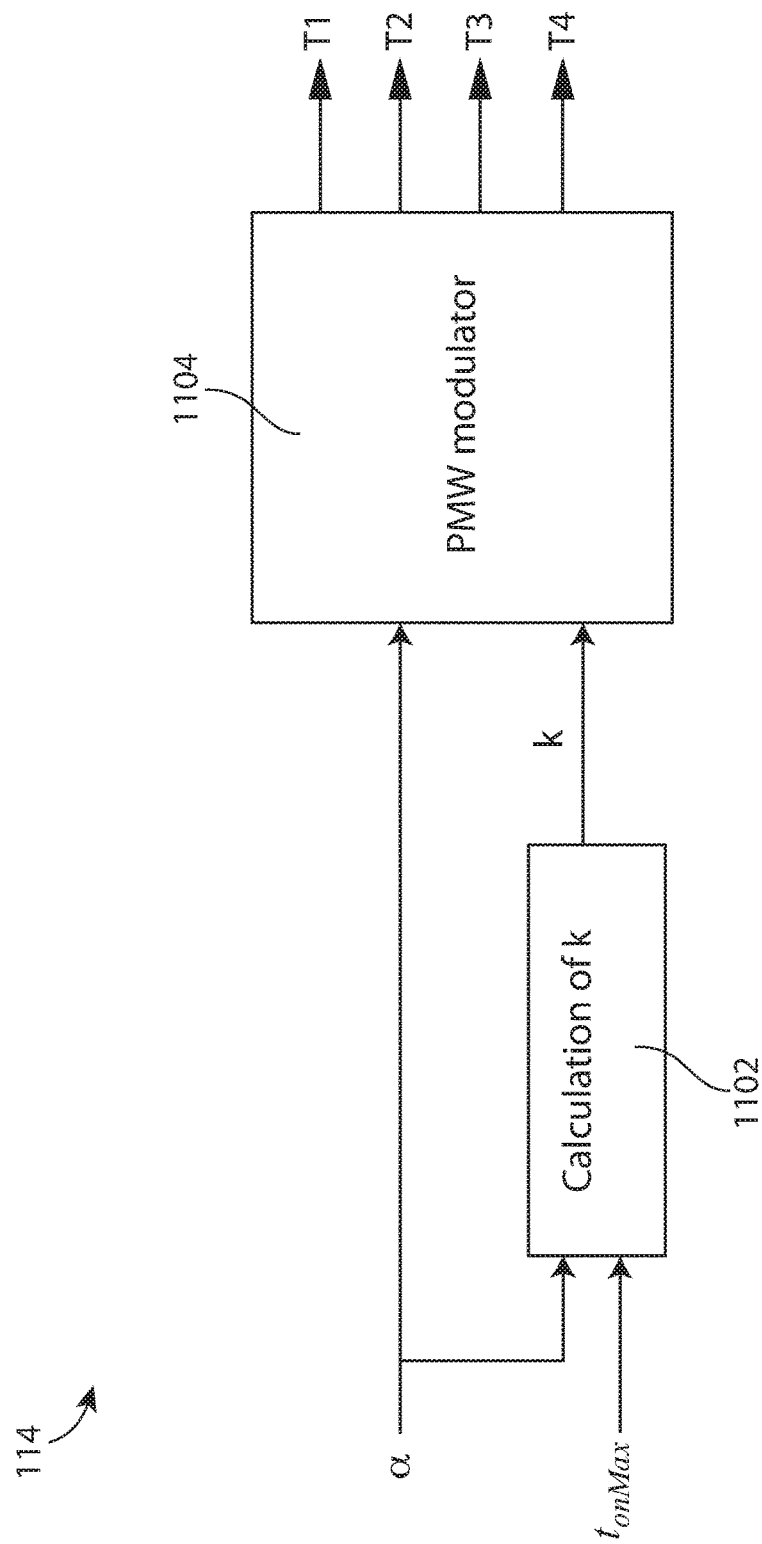
FIG. 11 is a block diagram of a controller according to aspects described herein.

As discussed above, the controller 114 operates the inverter 108 to introduce the new step (kT) in the switching period (T). FIG. 11 is a block diagram of the controller 114 according to at least one embodiment described herein. The controller 114 includes a k calculation module 1102 and a Pulse Width Modulation (PWM) modulator. The k calculation module 1102 calculates the value of the coefficient k based on the equation identified above. The coefficient k is applied to the PWM modulator 1104 and the PWM modulator 1104 sends control signals to the switches T1 202, T2 204, T3 206, T4 208 to operate the switches, based on the coefficient k, as described above.

Figure 12:
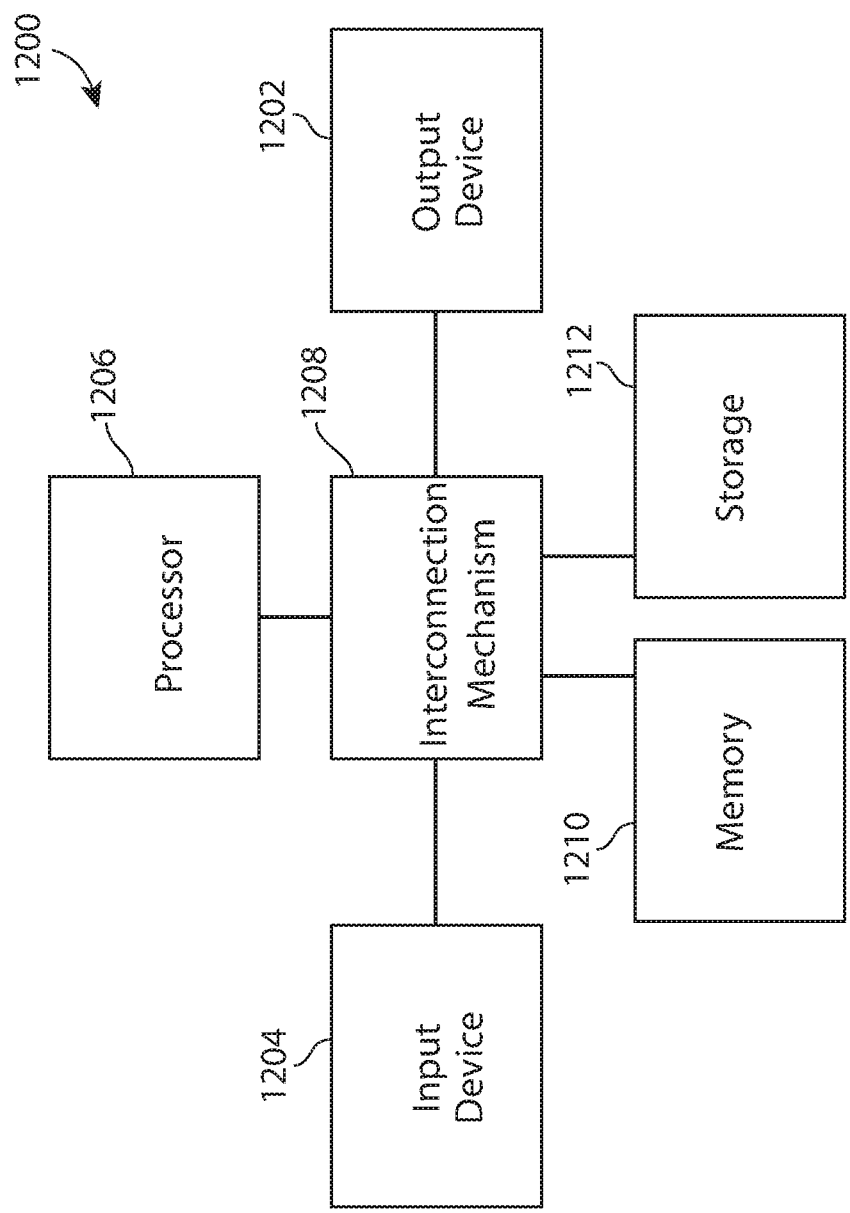
FIG. 12 is block diagram of a system upon which various embodiments of the invention may be implemented.

FIG. 12 illustrates an example block diagram of computing components forming a system 1200 which may be configured to implement one or more aspects disclosed herein. For example, the system 1200 may be communicatively coupled to the controller 114 or included within the controller 114. The system 1200 may also be configured to operate an inverter as discussed above.

The system 1200 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 1200 may include specially-programmed, special-purpose hardware, for example, an application-specific integrated circuit (ASIC). System 1200 may also include a Field Programmable Gate Array (FPGA). Various aspects of the present disclosure may be implemented as specialized software executing on the system 1200 such as that shown in FIG. 12.

The system 1200 may include a processor/ASIC 1206 connected to one or more memory devices 1210, such as a disk drive, memory, flash memory or other device for storing data. Memory 1210 may be used for storing programs and data during operation of the system 1200. Components of the computer system 1200 may be coupled by an interconnection mechanism 1208, which may include one or more buses (e.g., between components that are integrated within a same machine) and/or a network (e.g., between components that reside on separate machines). The interconnection mechanism 1208 enables communications (e.g., data, instructions) to be exchanged between components of the system 1200. The system 1200 also includes one or more input devices 1204, which may include for example, a keyboard or a touch screen. The system 1200 includes one or more output devices 1202, which may include for example a display. In addition, the computer system 1200 may contain one or more interfaces (not shown) that may connect the computer system 1200 to a communication network, in addition to or as an alternative to the interconnection mechanism 1208.

The system 1200 may include a storage system 1212, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1210 that allows for faster access to the information by the processor/ASIC than does the medium. This memory 1210 may be a volatile, random access memory such as a dynamic random access memory (DRAM) or static memory (SRAM). It may be located in storage system 1212 or in memory system 1210. The processor 1206 may manipulate the data within the integrated circuit memory 1210 and then copy the data to the storage 1212 after processing is completed. A variety of mechanisms are known for managing data movement between storage 1212 and the integrated circuit memory element 1210, and the disclosure is not limited thereto. The disclosure is not limited to a particular memory system 1210 or a storage system 1212.

The system 1200 may include a computer platform that is programmable using a high-level computer programming language. The system 1200 may be also implemented using specially programmed, special purpose hardware, e.g. an ASIC. The system 1200 may include a processor 1206, which may be a commercially available processor such as the well-known Pentium class processor available from the Intel Corporation. Many other processors are available. The processor 1206 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above and according to one embodiment, the controller 114 calculates the coefficient k based on the maximum conduction duration ($t_{onmax}$) parameter. According to one embodiment, the $t_{onmax}$ parameter is set by the firmware of the controller 114 based on the operating mode of the inverter 108. For example, according to one embodiment, $t_{onmax}$ is set to 0 when the inverter 108 is operating in a normal mode of operation and is set to 20 μs when the inverter 108 is operating in a short circuit condition. According to another embodiment, the value of the $t_{onmax}$ parameter is calculated by the controller 114 in real-time as a function of current through the switches, ambient temperature, and voltage on the busses 214, 218.

As discussed above, a system and method for improving thermal losses and efficiency of a 3-level inverter is described herein; however, in other embodiments, the principles described herein can be utilized with an architecture with more than three levels (e.g., 4, 5, or more). As also described above, the inverter system is utilized with a UPS coupled to a single-phase power source; however, in other embodiments, the inverter system may be utilized in a UPS coupled to another type of power (e.g., three-phase power or split-phase power).

As also discussed above, the inverter system is operated to generate +/−400V at the common point 215; however, in other embodiments, the inverter system can be operated to generate different voltage levels at the common point 215. As also discussed above, the inverter system is utilized in a UPS; however, in other embodiments, the inverter system can be utilized in another type of power system.

In at least one embodiment, a new 3-level inverter system and method is provided that balances the thermal losses between transistors during a short circuit on the AC side of the inverter, improves inverter performance, and allows the 3-level inverter to generate a zero voltage on the AC side of the inverter. By replacing a portion of the second and fourth modes of operation of the inverter 108 (e.g., where the output voltage of the inverter 108 is zero) by an equal duration at both +Vhdcp and −Vhdcm (i.e., in fifth and sixth modes of operation) as described above, the typical losses and thermal issues of an inverter can be reduced. In addition, the 3-level inverter system described herein can allow the output voltage of the inverter to reach any voltage around zero. It then can also improve the Total Harmonic Distortion (THD) by removing the non-linearity of traditional 3-level inverters at the zero crossings.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system comprising:
   an input configured to be coupled to an AC source and to receive input AC power from the AC source;

an output configured to provide output AC power to a load, the output AC power having a positive average output voltage level during a positive half-period of a line cycle and a negative average output voltage level during a negative half-period of the line cycle;
a converter coupled to the input and configured to convert the input AC power into DC power;
a plurality of DC busses coupled to the converter and configured to receive the DC power from the converter;
an inverter coupled to the plurality of DC busses, the inverter having a common point configured to receive the DC power from the plurality of DC busses and a filter coupled between the common point and the output, and the inverter configured to convert the DC power from the plurality of DC busses into the output AC power and provide the output AC power to the output; and
a controller configured to operate the inverter, during the positive half-period of the line cycle, by alternating between a first mode of operation to provide a positive voltage to the common point, a second mode of operation to provide a neutral voltage to the common point, and a third mode of operation to provide a negative voltage to the common point to generate the positive average output voltage level of the output AC power provided to the output.

2. The UPS system of claim 1, wherein the controller is further configured to operate the inverter, during the negative half-period of the line cycle, by alternating between a fourth mode of operation to provide a negative voltage to the common point, a fifth mode of operation to provide a neutral voltage to the common point, and a sixth mode of operation to provide a positive voltage to the common point to generate the negative average output voltage level of the output AC power provided to the output.

3. The UPS system of claim 2, wherein the inverter is based on an NPC-2 topology.

4. The UPS system of claim 3, wherein the plurality of DC busses includes a positive DC bus configured to maintain a positive DC voltage level, a mid-point DC bus, and a negative DC bus configured to maintain a negative DC voltage level, and
wherein the inverter comprises a plurality of switches coupled between the plurality of DC busses.

5. The UPS system of claim 4, wherein the plurality of switches includes:
a first switch coupled between the positive DC bus and the common point;
a second switch coupled to the mid-point DC bus;
a third switch coupled between the second switch and the common point; and
a fourth switch coupled between the negative DC bus and the common point.

6. The UPS system of claim 5, wherein in operating the inverter in the first mode of operation, the controller is further configured to operate the first switch to close, for a first period of time, to couple the positive DC bus to the common point and provide the positive voltage to the common point.

7. The UPS system of claim 6, wherein in operating the inverter in the second mode of operation, the controller is further configured to operate the second switch to close, for a second period of time, to couple the mid-point DC bus to the common point and provide the neutral voltage to the common point.

8. The UPS system of claim 7, wherein in operating the inverter in the third mode of operation, the controller is further configured to operate the fourth switch to close, for a third period of time, to couple the negative DC bus to the common point and provide the negative voltage to the common point.

9. The UPS system of claim 8, wherein the controller includes a calculation module configured to calculate a coefficient k based on a conduction duration time of the second switch, and
wherein the controller is further configured to define the first, second, and third periods of time based on the coefficient k.

10. The UPS system of claim 8, wherein the controller is further configured to define the first, second, and third periods of time to symmetrically distribute the first, second, and third modes of operation across the positive half-period of the line cycle.

11. The UPS system of claim 5, wherein in operating the inverter in the fourth mode of operation, the controller is further configured to operate the fourth switch to close to couple the negative DC bus to the common point and provide the negative voltage to the common point.

12. The UPS system of claim 11, wherein in operating the inverter in the fifth mode of operation, the controller is further configured to operate the second switch to close to couple the mid-point DC bus to the common point and provide the neutral voltage to the common point.

13. The UPS system of claim 12, wherein in operating the inverter in the sixth mode of operation, the controller is further configured to operate the first switch to close to couple the positive DC bus to the common point and provide the positive voltage to the common point.

14. A method for operating a UPS comprising an input configured to be coupled to a power source, an output, a plurality of DC buses including a positive DC bus, a mid-point DC bus, and a negative DC bus, and an inverter coupled to the plurality of DC busses, the inverter having a common point configured to receive DC power from the plurality of DC busses and a filter coupled between the common point and the output, the method comprising:
receiving input power from the power source;
maintaining a positive DC voltage level on the positive DC bus;
maintaining a negative DC voltage level on the negative DC bus;
converting, with the inverter, DC power from the plurality of DC busses into output AC power by providing the DC power received at the common point to the filter, the output AC power having a positive average output voltage level during a positive half-period of a line cycle and a negative average output voltage level during a negative half-period of the line cycle;
providing the output AC power to the output; and
operating the inverter, during the positive half-period of the line cycle, by alternating between a first mode of operation to provide a positive voltage to the common point, a second mode of operation to provide a neutral voltage to the common point, and a third mode of operation to provide a negative voltage to the common point to generate the positive average output voltage level of the output AC power provided to the output.

15. The method of claim 14, wherein the inverter comprises a plurality of switches coupled between the plurality of DC busses, and wherein operating the inverter in the first mode of operation includes operating the plurality of switches, for a first period of time, to couple the positive DC bus to the common point and provide the positive voltage to the common point.

16. The method of claim 15, wherein operating the inverter in the second mode of operation includes operating the plurality of switches, for a second period of time, to couple the mid-point DC bus to the common point and provide the neutral voltage to the common point.

17. The method of claim 16, wherein operating the inverter in the third mode of operation includes operating the plurality of switches, for a third period of time, to couple the negative DC bus to the common point and provide the negative voltage to the common point.

18. The method of claim 17, further comprising:
calculating a coefficient k based on a conduction duration time of at least one of the plurality of switches; and
defining the first, second, and third periods of time based on the coefficient k.

19. The method of claim 14, further comprising operating the inverter, during the negative half-period of the line cycle, by alternating between a fourth mode of operation to provide a positive voltage to the common point, a fifth mode of operation to provide a neutral voltage to the output, and a sixth mode of operation to provide a negative voltage to the common point to generate the negative average output voltage level of the output AC power provided to the output.

20. An Uninterruptible Power Supply (UPS) system comprising:
an input configured to be coupled to an AC source and to receive input AC power from the AC source;
an output configured to provide output AC power to a load, the output AC power having a positive average output voltage level during a positive half-period of a line cycle and a negative average output voltage level during a negative half-period of the line cycle;
a converter coupled to the input and configured to convert the input AC power into DC power;
a plurality of DC busses coupled to the converter and configured to receive the DC power from the converter;
an inverter coupled to the plurality of DC busses, the inverter having a common point configured to receive the DC power from the plurality of DC busses and a filter coupled between the common point and the output, and the inverter configured to convert the DC power from the plurality of DC busses into the output AC power and provide the output AC power to the output; and
means for operating the inverter, during the negative half-period of the line cycle, by alternating between a first mode of operation to provide a negative voltage to the common point, a second mode of operation to provide a neutral voltage to the common point, and a third mode of operation to provide a positive voltage to the common point to generate the negative average output voltage level of the output AC power provided to the output.

21. The UPS system of claim 1, further comprising means for operating the inverter, during the positive half-period of the line cycle, by alternating between a fourth mode of operation to provide a positive voltage to the common point, a fifth mode of operation to provide a neutral voltage to the common point, and a sixth mode of operation to provide a negative voltage to the common point to generate the positive average output voltage level of the output AC power provided to the output.

\* \* \* \* \*